United States Patent [19]

Smith et al.

[11] 4,442,004

[45] Apr. 10, 1984

[54] BIASING ARRANGEMENT AND FILTER UNIT FOR A FILTERING APPARATUS

[75] Inventors: Zan P. Smith, Summit; Frank Haimbach, IV, Nutley, both of N.J.

[73] Assignee: Osmonics, Inc., Minnetonka, Minn.

[21] Appl. No.: 394,195

[22] Filed: Jul. 1, 1982

[51] Int. Cl.³ .............................................. B01D 29/32
[52] U.S. Cl. ................................ 210/448; 210/323.2; 210/457; 210/497.01; 267/153
[58] Field of Search ................... 210/323.1, 323.2, 435, 210/437–448, 452, 454, 457, 497.01; 242/46.8; 267/63 R, 153, 181, 182

[56] References Cited

U.S. PATENT DOCUMENTS

| | | | |
|---|---|---|---|
| 2,572,981 | 10/1951 | Briggs | 210/437 |
| 3,118,836 | 1/1964 | Briggs | 210/437 X |
| 3,223,241 | 12/1965 | Kasten | 210/452 X |
| 3,275,144 | 9/1966 | Stripp et al. | 210/130 |
| 3,447,687 | 6/1969 | Canterbury | 210/232 |
| 3,556,300 | 1/1971 | Coda | 210/232 |
| 3,615,016 | 10/1971 | Soriente et al. | 210/323.2 X |
| 3,653,512 | 4/1972 | Brown | 210/130 |
| 4,035,300 | 7/1977 | Stapleton et al. | 210/172 |
| 4,042,508 | 8/1977 | Latimer et al. | 210/172 |
| 4,048,071 | 9/1977 | Yamada et al. | 210/90 |
| 4,174,282 | 11/1979 | Butterworth | 210/323.2 X |
| 4,235,427 | 11/1980 | Bialobrzeski | 267/153 |
| 4,248,714 | 2/1981 | Acosta | 210/323.2 X |
| 4,293,414 | 10/1981 | Gianneli | 210/437 X |

FOREIGN PATENT DOCUMENTS 1444800   8/1975   United Kingdom ................ 267/181

Primary Examiner—Robert H. Spitzer
Attorney, Agent, or Firm—Depaoli & O'Brien

[57] ABSTRACT

The present invention relates to a biasing arrangement for use with a filter element having a longitudinal bore therethrough. The biasing arrangement includes a spring element having first and second ends and being comprised of a plastic material. The spring element is deformable by pressure applied in the direction generally along an axis extending between the first and second ends. A sealing disk is adapted to seal an end of the longitudinal bore of the filter element. The sealing disk is also comprised of a plastic material and is positively secured to an end of the spring element. According to a further aspect of the present invention, the sealing disk is positively secured to an end of the filter element to define an integral filter unit. In the preferred embodiment, the spring element, the sealing disk, and the filter element are all comprised of compatible plastic materials. In accordance with a further aspect of the present invention, the spring element has a non-linear load/deflection characteristic such that a large force is obtained during initial deflection followed by a substantially constant force upon further deflection.

23 Claims, 3 Drawing Figures

BIASING ARRANGEMENT AND FILTER UNIT FOR A FILTERING APPARATUS

BACKGROUND AND SUMMARY OF THE PRESENT INVENTION

The present invention relates generally to a biasing arrangement for use with a filter element. More particularly, the present invention relates to a filter element and a spring element forming an integral filter unit for use in a filtering apparatus.

In a known type of filtering apparatus, one or more elongated filter elements are arranged within a single housing often in a generally vertical orientation. The filter elements may be comprised of spun synthetic fibers, wound cotton, pleated paper or the like and are generally formed as a hollow cylindrical member. These hollow filter elements are arranged over fittings in a lower end of the housing which fittings communicate with a common collection chamber there below. An inlet opening is provided in the housing generally between the ends of the filter elements.

In order for a fluid to be filtered, the fluid must pass through the walls of the filter element. Accordingly, a sealing arrangement is preferably arranged at both upper and lower ends of each of the filter elements. In order to further ensure that the fluid does not bypass the filter elements, the fluid tightness of the seals are often further enhanced by the application of an axial compressive force on the filter elements. Accordingly, in the prior art a cover plate is often provided which is secured against the upper ends of the filter elements thereby urging the lower ends of the filter elements into tight engagement about the fittings.

Due to variations in height of both the filter elements themselves and the various housings with which the filter elements may be used, it has been found desirable to employ a biasing arrangement between the cover plate and the upper end of each of the filter elements. In this way, compensation for the variations in height is accomplished while still maintaining appropriate seals at the upper and lower ends of the filter element.

In prior art systems, a metallic spring element has often been used. The spring element may include a cup-like metal disk arranged at an end of the spring element which disk is adapted to abut the upper end of a respective filter element. Also, a centering pin adapted to be received within the longitudinal bore of the filter element is often provided to aid in retaining the spring element in place.

Numerous disadvantages occur during the use of such a metallic spring element and disk. Firstly, it is sometimes difficult to maintain each of the spring elements on the end of the respective filter elements while attempting to secure the cover plate over the plurality of filter elements. If one spring element becomes dislodged during assembly, it is necessary to remove the cover plate and realign the disk and spring before attempting to fasten the cover plate securely to the housing. Additionally, it is not always apparent that a spring element has been dislodged. Therefore, a housing may be operated with fluid bypassing one or more filter elements. Also, a dislodged spring element can be difficult and time consuming to retrieve from the bottom of a vertical housing. A further disadvantage occurs when the filter elements are spent and must be changed. In addition to handling a plurality of filter elements, time is required for collecting the spring elements, holding them, and replacing the spring elements on fresh filter elements. Also, spring elements may be lost or misplaced during changing of the filter elements. Still further, the compatibility of the metal spring with the fluid must be considered. In other words, chemicals contained in certain fluids may cause an adverse effect on the composition of the metallic spring thereby causing corrosion of the spring and/or contamination of the effluent. Still a further disadvantage of the known system is the relatively high cost of the metal spring and seal disk arrangements.

One proposed solution includes the use of a rubber doughnut or sealing ring attached to the lower end of the filter element. The doughnut was purported to provide both sealing and centering of the lower end of the filter along with the resilient function of a spring. A plug of suitable material was also proposed for the upper end of the filter element. Such an arrangement was found not to be entirely satisfactory. The cost of separate doughnuts and upper end plugs was higher than anticipated and the time required for handling of the extra elements may be unacceptable.

Accordingly, it is an object of the present invention to overcome the disadvantages mentioned above in the prior art biasing arrangements for filter elements within a filtering apparatus.

It is a further object of the present invention to provide a biasing arrangement for use with a filter element which is both inexpensive to produce and relatively easy to handle during assembly.

Still a further object of the present invention is to provide a biasing arrangement which is readily disposable when the filter element has become unusable. Yet a further object of the present invention is to provide a biasing arrangement which is more readily compatible with the fluid stream passing through the filter element.

Additionally, it is an object of the present invention to provide a filter unit for use in a filtering apparatus which can be readily installed by a simple and expeditious procedure in housings having slight variations in overall height.

These objects and others are achieved by a biasing arrangement according to the present invention for use with a filter element having a longitudinal bore therethrough. The biasing arrangement includes a spring element having first and second ends and comprised of a plastic material. The spring element is deformable by pressure applied in a direction generally along an axis extending between the first and second ends. A sealing disk adapted to seal an end of the longitudinal bore of the filter element is also comprised of a plastic material. The sealing disk is positively secured to an end of the spring element.

The sealing disk may be secured to the end of the spring element by spin welding, fusion welding, hot melt welding, ultrasonic welding or another suitable adhesive method. Alternatively, the spring element and the sealing disk may be molded as a single unit. In a preferred embodiment, the spring element and the sealing disk are comprised of a compatible plastic material. In an especially preferred embodiment, the plastic material of the spring and the sealing disk is polypropylene.

In accordance with a further aspect of the present invention, a filter unit is provided for use in a filtering apparatus including at least one filter unit. The filter unit includes an elongated filter element having a longitudinal bore therethrough. A spring element having first and second ends is deformable by a pressure applied in a direction generally along an axis extending between the first and second ends. A sealing disk for sealing an end of the longitudinal bore of the filter element is also provided. The spring element, the sealing disk and the filter element are positively secured to one another to define an integral unit.

Further, in the preferred embodiment, the spring element has a nonlinear load deflection characteristic. In particular, the spring element develops a large force during initial deformation followed by a substantially constant force upon further longitudinal deflection of the spring element.

BRIEF DESCRIPTION OF THE DRAWINGS

A preferred embodiment of the present invention will be described in greater detail with reference to the accompanying drawings, wherein like members bear like reference numerals and wherein.

DETAILED DESCRIPTION OF THE PREFERRED EMBODIMENT

Figure 1:
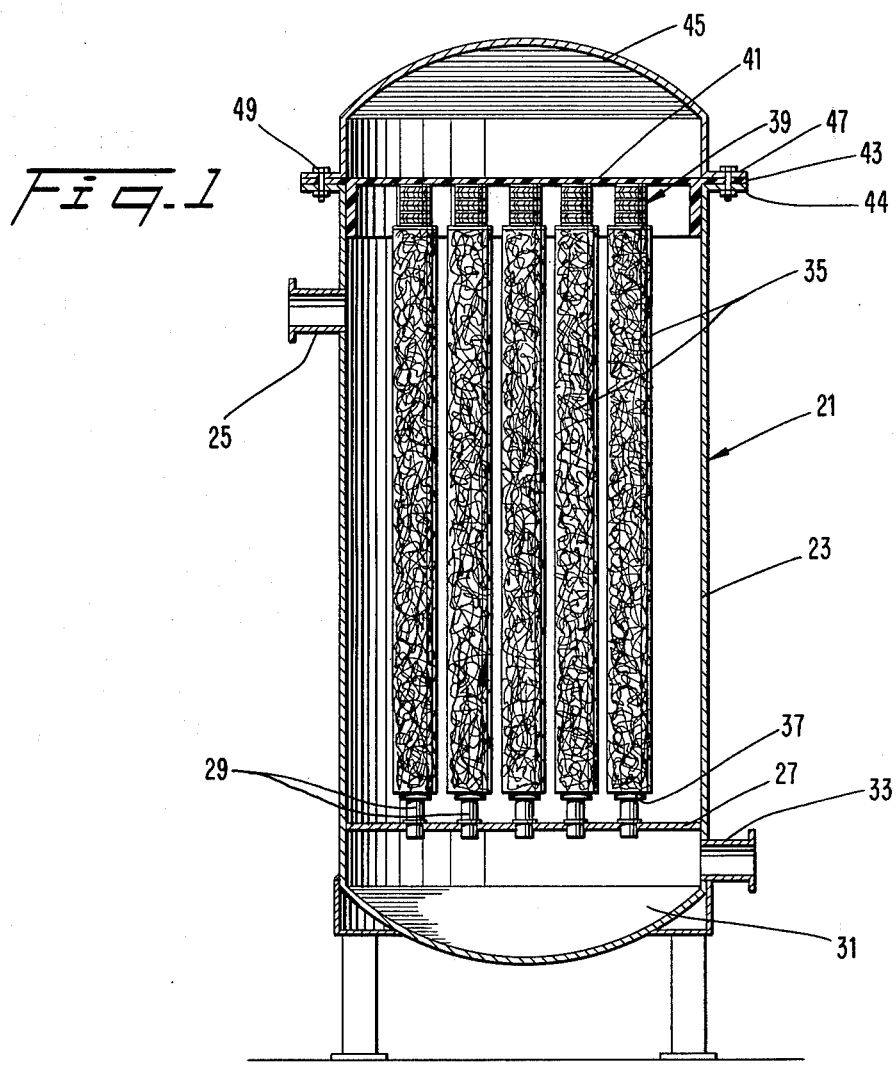
FIG. 1 is a schematic view of a filtering apparatus employing a biasing arrangement and filter unit according to the present invention.

With reference to FIG. 1, a filtering apparatus 21 with which a biasing arrangement according to the present invention may be used includes a generally cylindrical housing 23 having an inlet 25 arranged in a wall thereof. A plate 27 is arranged in a lower portion of the housing 23 and includes a plurality of openings which are adapted to receive an equal plurality of fittings 29. The fittings 29 are sealed in a fluid tight manner to the lower plate 27 in a known manner. A lower end of each of the fittings 29 communicates with a collection chamber 31 which includes an outlet 33.

An upper end of each of the fittings 29 is adapted to receive a filter element 35 in the form of an elongated cylinder having a longitudinal bore therethrough. In general, the outside diameter of the filter element 35 is between approximately 2 to 4 inches while the inside diameter is between about ½ to 2 inches. A filter element of this type is generally rigid, i.e., either self supporting or with a perforated support tube extending along the longitudinal bore. A suitable filter element is produced under the name HYTREX ® manufactured by Celanese Corporation. The HYTREX ® filter is comprised of spun polypropylene fibers.

A lower end of each of the filter elements 35 must be sealed against the respective fitting 29 to prevent leakage of fluid feed stream from the inlet 25 directly into the fittings 29 without passing through the filter element 35. Various types of sealing arrangements 37 are commercially available and are generally provided on the fittings 29. For example, the sealing arrangement 37 may be a flat surface against which the lower end of the filter element 35 is pressed. Alternatively, the sealing arrangement 37 may be provided with a knife edge for penetrating the lower end of the filter element 35. A further known sealing arrangement 37 is comprised of a cup provided on each fitting 29 and adapted to encircle the lower end of the filter element 35. It is desirable in each of the sealing arrangements noted above that the filter element 35 be urged or forced against the sealing arrangement 37 in order to ensure an effective seal between the lower end of the filter element 35 and the sealing arrangement 37.

In order to provide the proper downward pressure on the filter elements 35, a biasing arrangement 39 according to the present invention is provided at an upper end of each of the filter elements 35. It should be noted that while the present invention is described for use at an upper end of the filter element 35, it may be advantageous to incline or invert the filtering apparatus 21 for certain applications. The biasing arrangement according to the present invention is equally applicable to such a rearrangement of the filtering apparatus. The biasing arrangement 39 is urged downwardly against the upper end of the filter element 35 by a cover plate 41 or similar arrangement. The cover plate 41 is urged downwardly against an upper end of the biasing arrangements 39 thereby causing a downward pressure to be exerted against the filter elements 35.

In the illustrated embodiment, the cover plate 41 includes flanges 43 cooperating with flanges 44 which extend outwardly of the housing 23. A cap member 45 includes flanges 47 which are adapted to engage the flanges 43 of the cover plate 41. Often, the cover plate 41 and the cap member 45 are formed as a single unit. The flanges 43, 44, 47 are each provided with bores therethrough adapted to receive securing arrangements 49, for example, bolts, for urging the cover plate 41 and thereby the biasing arrangements 39 and the filter elements 35 downwardly. It should be noted that in an unstressed condition, the biasing arrangements 39 extend above the location of the cover plate as shown in FIG. 1. It again should be noted that the biasing arrangement according to the present invention is adaptable for use with any suitable arrangement for securing the cover plate 41 and/or the cap member 45.

During assembly of the filtering apparatus, individual filter elements 35 are placed over the fittings 29 within the housing 23. In addition, the biasing arrangement is provided at the upper end of the filter 35 as will be discussed in greater detail below. Thereafter, the cover plate 41 is arranged over the plurality of biasing arrangements 39 and the cap member 45 is placed above the cover plate 41. The securing arrangements 49 are then slowly tightened until the cover plate flanges 43 abut the housing flanges 44. During this securement, the biasing arrangements 39 are compressed thereby urging the filter elements 35 into tight sealing engagement with the sealing arrangements 37 arranged at the upper end of the fittings 29.

Figure 2:
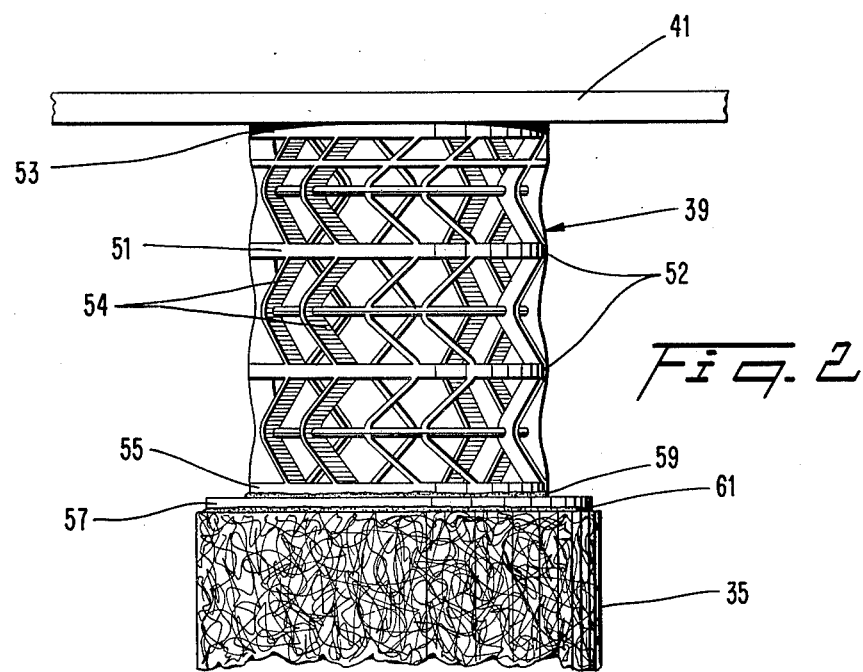
FIG. 2 is an enlarged schematic view of a portion of FIG. 1 illustrating the filter unit according to the present invention.

With reference to FIG. 2, the biasing arrangement 39 according to the present invention includes a spring element 51 having first and second ends 53, 55, respectively. The first end 53 is adapted to be engaged by the cover plate 41 during assembly of the filtering apparatus 21. The spring element 51 is deformable by pressure applied in a direction generally along an axis extending between the first end 53 and the second end 55.

The spring element 51 is comprised of a plastic material which is capable of being deformable by pressure, but which will maintain the sealing relationship with the filter element 35. Additionally, the plastic material should be compatible with the material of the filter element 35 and the material present during the filtering operation. In other words, the plastic material should be substantially unaffected during the life of the filter element by the constituents in the fluid to be filtered. Compatibility of the spring element 51 and the filter element 35 should also include a similarity in acceptable disposal methods, e.g., by burning without the generation of unacceptable quantities of ash or noxious fumes. Accordingly, no special considerations need be given for the spring element 51 when employing a compatible plastic material for the filter element 35 and the spring element 51. Suitable plastic materials include polyacrylates, polymethacrylates, polyvinyl chloride, polyolefins, such as polyethylene, polypropylene, etc., and other polymers which display similar properties as will be apparent to those of ordinary skill in the art.

According to the present invention, sealing of the upper end of the filter element 51 is accomplished by a sealing disk 57 which is integral with the spring member 51 and comprised of a plastic material. The sealing disk 57 is preferably formed as a thin, substantially planar circular disk of approximately the same diameter as the outside diameter of the filter element 35. In the preferred embodiment, the sealing disk 57 is comprised of a plastic material which is compatible with the plastic material of the spring element 51. As noted above, compatibility of the plastic materials includes similar resistance to constituents in the fluid to be filtered and common methods of disposal. In an especially preferred embodiment employing a polypropylene filter element 35, the sealing disk 57 is also comprised of polypropylene as is the spring element 51.

The sealing disk 57 is positively secured to the lower end 55 of the spring element 51 along a seam 59. The securement of the sealing disk 57 may be accomplished by spin welding, fusion welding, hot melt welding, ultrasonic welding or another suitable adhesive method. Such bonding methods are both relatively simple and inexpensive. Alternatively, the spring element 51 and the sealing disk 57 may be molded in a single operation as a single unit. Any other suitable method for securely attaching the sealing disk 57 and the spring element 35 together as an integral unit is acceptable.

According to a further aspect of the present invention, the sealing disk 57 is positively secured to the upper end of the filter element 35 to form an integral filter unit comprised of the spring element 51, the sealing disk 57 and the filter element 35. The sealing disk 57 is secured to the upper end of the filter element 35 along a seam 61 by spin welding, fusion welding, hot melt welding, ultrasonic welding or another suitable adhesive method. This integral filter unit arrangement greatly facilitates handling of the filter element and biasing arrangement over that of the prior art.

As noted previously, during assembly of the filtering apparatus 21, the cover plate 41 must be arranged over the plurality of biasing arrangements 39 provided at the ends of the filter elements 35. By providing an integral filter unit, the possibility that the biasing arrangements may become dislodged is substantially eliminated. Still further, since the spring element 51 and the sealing disk 57 are comprised of a relatively inexpensive plastic material, the entire filter unit, i.e., the filter element 35, the sealing disk 57 and the spring element 51, may be discarded when the filter element 35 becomes unusable due to clogging or fouling. In the preferred embodiment, the plastic material of the spring element, the sealing disk and the filter element are all compatible and may be comprised, e.g., of polypropylene. In this way, disposal is greatly facilitated since the entire unit can be easily incinerated. Still further, by using a compatible plastic material for each of the elements, the welding along the seams 59, 61 may be facilitated.

It should be noted that the biasing arrangement, i.e., the plastic spring element 51 and sealing disk 57 may be used without being positively secured to the upper end of the filter element 35. In such an arrangement, the downward force exerted on the spring element 51 by the cover plate 41 is sufficient to adequately seal the longitudinal bore extending through the filter element 35 with the sealing disk 57. With such an arrangement, it may be desirable to provide a centering pin (not shown) on a lower surface of the sealing disk 57 which centering pin is adapted to be received within the longitudinal bore of the filter element 35 to aid in retaining the biasing arrangement 39 in the proper location at the upper end of the filter element 35 during securement of the cover plate 41. It should be noted that by positively securing the sealing disk 57 to the filter elements, the fluid tightness of the seal may be more carefully controlled. Also, the spring element 51 of the biasing arrangement 39 need only effect the seal between the fitting 29 and the lower end of the respective filter element 35.

Two commercially available plastic spring elements have been found to be suitable for use in the biasing arrangement 39 according to the present invention. One suitable spring element 51 is manufactured by Crellin Plastics of Chatham, New York and another spring is distributed by Custom Industries, Inc. of Greensboro, N.C. Each of the springs, however, is generally manufactured in approximately a 6–7 inch length for particular use as a dye spring, i.e., as a resilient bobbin for receiving yarn or fibers in a dyeing and finishing operation. In order to function as the spring element 51 of the biasing arrangement 39 of the present invention, it is not necessary to use the full length of the supplied springs. The springs may be cut to a length of $3\frac{1}{2}$ inches or less. Further, the function and operating conditions of the resilient bobbins in the dyeing and finishing operation are substantially different from the function and environment of the spring elements 51 of the biasing arrangement 39 according to the present invention.

Each of the available, suitable spring elements is generally cylindrical in configuration. The cylindrical surface of the spring elements is formed by a plurality of annular rings 52 which are interconnected by longitudinal extending ribs 54. The ribs 54 are generally angled with respect to the longitudinal axis of the spring element 51 to aid in providing the longitudinal deformation of the spring element 51 by a pressure applied along the longitudinal axis. In other words, the cylindrical surface of the spring element is defined by a web-like structure. It should be noted that the configuration of the plastic spring element 51 is substantially different from the configuration of a conventional, helically-coiled metal spring.

Figure 3:
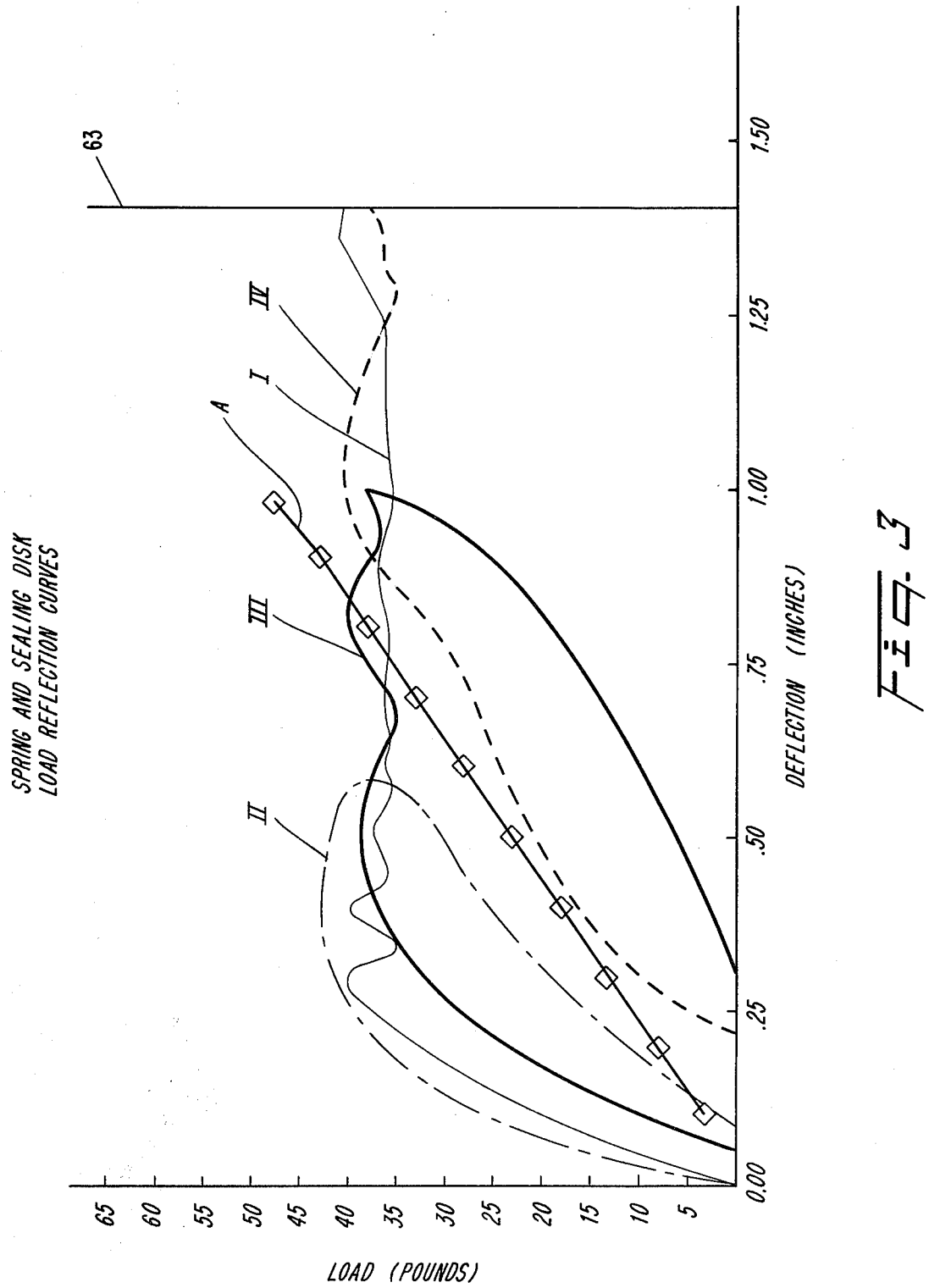
FIG. 3 is a graph of the general load/deformation characteristics of a spring element according to the present invention.

An unexpected characteristic of the spring elements which characteristic is particularly advantageous for use in the biasing arrangement 39 according to the present invention, is a non-linear load/deflection curve of the available springs. With reference to FIG. 3, the general load/deflection curve of a spring element according to the present invention is designated by Curve I. It should be noted that the graph of FIG. 3 is not related specifically to either of the springs found suitable for use in the biasing arrangement 39 according to the present invention. Rather, the graph is a general illustration of the load/deflection characteristics of either of the suitable springs and the values indicated on the graph are approximate.

As can be seen from Curve I, the load increases rapidly during initial deflection of the spring element 51. After a relatively small deflection, the load remains substantially constant until the spring is fully collapsed (indicated by a vertical line designated by reference numeral 63). The load remains substantially constant as the displacement increases due to the nature of the plastic material and the configuration of the spring elements. In contrast, the prior art steel spring and disk (Curve A) has a substantially linear load/deflection characteristic similar to a classical spring.

During the first installation of the biasing arrangement 39, the spring element 51 is deflected and follows Curve II to the substantially constant load level. Upon removal of the load upon the spring element, e.g., by releasing the cover plate 41, the spring element returns along the Curve II substantially to the initial state. Upon reloading of the spring element (Curve III), the force of the spring element again increases rapidly and attains substantially the same constant load as on the first deflection of the spring element. Upon unloading, the spring element returns along the Curve III to a slightly deflected condition. Upon a third loading of the spring (Curve IV), further deflection of the spring is required to initiate the rapid increase in load. However, the spring element 51 still substantially attains the same ultimate load as in the first two loadings. It should be noted that the value of the load may diminish slightly over time. However, the load remains sufficiently high to ensure proper sealing of the filter elements.

This repeatable pattern of substantially constant load permits use of the biasing arrangement 39 of the present invention during more than one opening of the housing. Such repeated openings may occur, for example, if, upon initial delivery of a fluid to the filtering apparatus 21, a leak develops necessitating a re-opening of the apparatus. After repairing the leak, the cover plate 41 can be reinstalled and the force exerted by the biasing arrangement 39 upon the respective filter element 35 is sufficient to ensure a proper seal of the lower end of the filter element 35 against the fitting 29.

A further advantage obtained from the non-linear characteristics of the spring element 51 is that the biasing arrangement 39 is more readily adaptable to a wider range of differing heights of filter elements 35 and/or filter housing 21. Since the maximum force of the spring element 51 is obtained with even a slight deflection of the spring element, the spring element 51 can be used with housing/cover plate combinations which are only slightly shorter than the completed integral filter unit according to the present invention. Also, if a larger deflection of the spring element is required to secure the cover plate 41 properly to the housing 23, the maximum force exerted by the spring element 51 against the filter element 35 is substantially the same as that obtained with the small deflection of the spring element 51. Accordingly, the spring element 51 used in the biasing arrangement 39 according to the present invention is readily adaptable to a larger variety of housings produced by various manufacturers.

The present invention provides a biasing arrangement which is both relatively simple and inexpensive to produce. Further, the biasing arrangement is effective to seal an upper end of a filter element and to provide a proper biasing force to ensure sealing of a lower end of the filter element. Further, the integral filter unit according to the present invention is substantially simpler to handle and install than the separable spring/seal unit and filter element of the prior art.

In addition, in the preferred embodiment of the present invention, the biasing arrangement, i.e., the spring element and sealing disk, is comprised of a plastic material which is compatible with the plastic material of the filter element. In other words, compatibility with the fluid to be filtered and disposal of the biasing arrangement according to the present invention is greatly simplified. Still further, the unexpected non-linear and repeatable characteristics of the spring element according to the present invention enhances the adaptability of the biasing arrangement to a wider variety of commercially available filtering apparatus.

The principles, preferred embodiment and mode of operation of the present invention have been described in the foregoing specification. However, the invention which is intended to be protected is not to be construed as limited to the particular embodiments disclosed. The embodiments are to be regarded as illustrative rather than restrictive. Various modifications and changes may be made by others without departing from the spirit of the present invention. Accordingly, it is expressly intended that all such variations and changes which fall within the spirit and scope of the present invention as defined in the claims be embraced thereby.

What is claimed is:

1. A biasing arrangement for use with a filter element having a longitudinal bore therethrough, the biasing arrangement comprising a spring element having first and second ends, said spring element being comprised entirely of a plastic material and being deformable by pressure applied in a direction generally along an axis extending between said first and second ends, a generally planar sealing disk adapted to seal an end of the longitudinal bore of the filter element, said sealing disk being comprised entirely of a plastic material, and said sealing disk being permaently positively secured to an end of said spring element.

2. The biasing arrangement according to claim 1, wherein the plastic material of said spring element and the plastic material of said sealing disk are compatible.

3. The biasing arrangement according to claim 2, wherein the plastic material of both said spring element and said sealing disk is polypropylene.

4. The biasing arrangement according to claim 1 or 2, wherein said sealing disk is positively secured to said end of the spring element by spin welding, fusion welding, hot melt welding or ultrasonic welding.

5. The biasing arrangement according to claim 1 or 2, wherein the spring element and the sealing disk are molded as a single unit.

6. The biasing arrangement according to claim 1, wherein said disk is positively secured to an end of the filter element to seal the longitudinal bore.

7. The biasing arrangement according to claim 1, wherein said spring element has a non-linear load/deflection characteristic.

8. The biasing arrangement according to claim 7, wherein the spring element develops a large force during initial deflection followed by a substantially constant force.

9. The biasing arrangement according to claim 8, wherein said spring element attains substantially the same constant force upon repeated loadings.

10. The biasing arrangement according to claim 1, wherein the spring element includes a plurality of annular rings interconnected by angled ribs extending along the longitudinal axis of the spring element.

11. A filter unit for use in a filtering apparatus employing at least one filter unit, said filter unit comprising an elongated filter element including filtering material and having a longitudinal bore therethrough, a spring element having first and second ends, said spring element being deformable by a pressure applied in a direction generally along an axis extending between said first and second ends, a sealing disk for sealing an end of the longitudinal bore of the filter element, said sealing disk being positively directly secured to both an end of said spring element and an end of said filtering material such that said spring element, said sealing disk and said filter element define an integral unit, said spring element, said sealing disk and said filtering material each being comprised of a plastic material.

12. The filter unit according to claim 11, wherein said spring element and said sealing disk are comprised of compatible plastic materials.

13. The filter unit according to claim 11, wherein said spring element, said sealing disk and said filter element are comprised of compatible plastic materials.

14. The filter unit according to claim 11 or 12, wherein said sealing disk is positively secured to said spring element by spin welding, fusion welding, hot melt welding or ultrasonic welding.

15. The filter unit according to claim 11 or 12, wherein said sealing disk and said spring element comprise a single molded unit.

16. The filter unit according to claim 11 or 13, wherein said filter element is positively secured to said sealing disk by spin welding, fusion welding, hot melt welding or ultrasonic welding.

17. The filter unit according to claim 12 or 13, wherein the plastic material is polypropylene.

18. The filter unit according to claim 11, wherein said spring element has a non-linear load/deflection characteristic.

19. The filter unit according to claim 18, wherein the spring element develops a large force during initial deflection followed by a substantially constant force.

20. The filter unit according to claim 19, wherein said spring element attains substantially the same constant force upon repeated loadings.

21. A biasing arrangement for use with a filter element having a longitudinal bore therethrough, the biasing arrangement comprising a spring element having first and second ends, said spring element being deformable by pressure applied in a direction generally along an axis extending between said first and second ends, a sealing disk adapted to seal an end of the longitudinal bore of the filter element, said sealing disk being positively secured to an end of said spring element, and said spring element having a non-linear load/deflection characteristic, said non-linear characteristic developing a large force upon initial deflection of the spring element followed by a substantially constant force.

22. The biasing arrangement according to claim 21, wherein said spring element and said sealing disk are comprised of compatible plastic materials.

23. The filter unit according to claim 21, wherein said spring element attains substantially the same constant force upon repeated loadings.

* * * * *